(12) United States Patent
Pereira

(10) Patent No.: US 6,527,043 B2
(45) Date of Patent: Mar. 4, 2003

(54) APPARATUS FOR CASTING SOLDER ON A MOVING STRIP

(75) Inventor: John Pereira, Rehoboth, MA (US)

(73) Assignee: Antaya Technologies Corporation, Cranston, RI (US)

( * ) Notice: Subject to any disclaimer, the term of this patent is extended or adjusted under 35 U.S.C. 154(b) by 0 days.

(21) Appl. No.: 09/845,762

(22) Filed: May 1, 2001

(65) Prior Publication Data

US 2002/0162641 A1 Nov. 7, 2002

(51) Int. Cl.[7] .......................... B22D 11/00; B22D 19/00
(52) U.S. Cl. .......................... 164/461; 164/419; 164/98
(58) Field of Search .................... 164/461, 419, 164/497, 97, 98, 133, 119, 134

(56) References Cited

U.S. PATENT DOCUMENTS

| | | | |
|---|---|---|---|
| 112,054 A | 2/1871 | Lang | |
| 905,758 A | 12/1908 | Strange et al. | |
| 2,216,510 A | 10/1940 | Burns | 29/155.55 |
| 2,763,044 A * | 9/1956 | Brennan | 164/461 |
| 2,782,473 A * | 2/1957 | Brennan | 164/419 |
| 2,838,814 A * | 6/1958 | Brennan | 164/419 |
| 3,522,836 A | 8/1970 | King | 164/87 |
| 3,745,631 A | 7/1973 | Jonason et al. | 29/157.3 |
| 3,937,270 A | 2/1976 | Hazelett et al. | 164/50 |
| 4,025,035 A | 5/1977 | Jonason | 228/185 |
| 4,221,257 A | 9/1980 | Narasimhan | 164/87 |
| 4,224,978 A | 9/1980 | Klein | 164/86 |
| 4,321,289 A * | 3/1982 | Bartsch | 118/101 |
| 4,393,917 A | 7/1983 | Fuchs, Jr. | 164/476 |
| 4,412,642 A | 11/1983 | Fisher, Jr. | 228/173 |
| 4,441,118 A | 4/1984 | Fister et al. | 357/70 |
| 4,520,859 A | 6/1985 | Fournier et al. | 164/253 |
| 4,552,199 A | 11/1985 | Onoyama et al. | 164/423 |
| 4,562,877 A | 1/1986 | Fournier et al. | 164/463 |
| 4,694,885 A | 9/1987 | Sakaguchi et al. | 164/416 |
| 4,763,718 A | 8/1988 | Maringer | 164/463 |
| 4,896,715 A | 1/1990 | Honeycutt | 164/479 |
| 4,921,037 A | 5/1990 | Bergeron et al. | 164/432 |
| 4,934,443 A | 6/1990 | Honeycutt, III et al. | 164/479 |
| 5,035,280 A | 7/1991 | Huin et al. | 164/463 |
| 5,077,094 A * | 12/1991 | McCall et al. | 164/461 |
| 5,111,871 A * | 5/1992 | Cook | 164/119 |
| 5,200,368 A * | 4/1993 | Kojima et al. | 118/74 |
| 5,244,031 A * | 9/1993 | Cook et al. | 164/119 |
| 5,480,496 A | 1/1996 | Ward | 148/437 |
| 5,513,691 A | 5/1996 | Langner et al. | 164/418 |
| 5,520,323 A | 5/1996 | Hauner et al. | 228/254 |
| 5,836,377 A | 11/1998 | Reichelt et al. | 164/486 |
| 5,971,058 A | 10/1999 | Bolde et al. | 164/130 |

FOREIGN PATENT DOCUMENTS

GB   1162887   8/1969   .............. C23C/1/00

* cited by examiner

*Primary Examiner*—M. Alexandra Elve
*Assistant Examiner*—Kevin McHenry
(74) *Attorney, Agent, or Firm*—Hamilton, Brook, Smith & Reynolds, P.C.

(57) ABSTRACT

An apparatus for casting molten metal onto a moving strip of material includes a stationary die having upstream and downstream portions with a casting portion, past which the strip of material is capable of being moved. The casting portion has a casting channel extending from the upstream portion through the downstream portion for facing the moving strip to contain and shape the molten metal into a profile against the moving strip. A heating arrangement heats the upstream portion of the stationary die to prevent the molten metal from solidifying within the casting channel at the upstream portion, thereby allowing the molten metal to fill the casting channel. The casting channel at the downstream portion allows the molten metal to cool while passing therethrough to solidify sufficiently to retain the shape of the casting channel when exiting the stationary die.

30 Claims, 4 Drawing Sheets

APPARATUS FOR CASTING SOLDER ON A MOVING STRIP

BACKGROUND

Some electrical components are formed from a copper ribbon having a centrally positioned narrower strip of solder extending longitudinally thereon. The common method currently used for manufacturing such a product is to place a solder ribbon on a copper ribbon that is wider than the solder ribbon and melt the solder ribbon onto the copper ribbon. The molten solder is then allowed to solidify and bond thereon. When the solder ribbon melts, the molten solder tends to flow uncontrollably so that the overall dimensions and surface finish of the resulting solder layer are inconsistent. In order to provide a copper ribbon product that has a dimensionally consistent layer of solder thereon, the layer of solder must then be machined to the desired dimensions. A drawback of this method is that it wastes material, it is inefficient, and fairly expensive.

SUMMARY

The present invention is directed to an apparatus and method for forming a metallic profile on a strip of material in an efficient and cost effective manner. The present invention is directed to an apparatus for casting molten metal onto a moving strip of material including a stationary die having upstream and downstream portions with a casting portion, past which the strip of material is capable of being moved. The casting portion has a casting channel extending from the upstream portion through the downstream portion for facing the moving strip for containing and shaping the molten metal into a profile against the moving strip. A heating arrangement heats the upstream portion of the stationary die to prevent the molten metal from solidifying within the casting channel at the upstream portion, thereby allowing the molten metal to fill the casting channel. The casting channel at the downstream portion allows the molten metal to cool while passing therethrough to solidify sufficiently to retain the shape of the casting channel when exiting the stationary die.

In preferred embodiments, the moving strip is a metallic strip and the molten metal is molten solder. A preheating station preheats the moving strip prior to casting the molten metal thereon. The heating arrangement on the upstream portion of the stationary die includes at least one heating device. A cooling system cools the downstream portion of the stationary die and may be a recirculating fluid cooling system. The casting portion of the stationary die is adapted to abut the moving strip such that the casting channel of the stationary die and the moving strip define the profile of the cast metal therebetween. A guide channel is formed in the casting portion of the stationary die for guiding the moving strip therethrough in relation to the casting channel. The moving strip is held against the casting portion by a support portion of the stationary die. A reservoir for containing a supply of molten metal is formed in the stationary die in communication with the casting channel. The reservoir and the casting channel are connected by a tapering transition region. A delivery conduit delivers molten metal to the reservoir and the stationary die. A heated chamber stores the molten metal and supplies the delivery conduit with the molten metal which is pumped through the delivery conduit by a pumping device.

The present invention is also directed to a stationary die for casting molten metal onto a moving strip of material including a reservoir for containing molten metal. The stationary die also includes a casting channel having casting surfaces for containing and shaping the molten metal into a profile against the moving strip. A tapering transition region connects the reservoir to the casting channel, wherein the reservoir, the transition region and the casting channel are longitudinally aligned and configured to face the moving strip.

The present invention is further directed to a method of casting molten metal onto a moving strip of material including moving the strip of material past a stationary die having upstream and downstream portions. A casting channel faces the moving strip and extends from the upstream portion through the downstream portion. The molten metal is contained and shaped into a profile against the moving strip with the casting channel. The upstream portion of the stationary die is heated to prevent the molten metal from solidifying within the casting channel at the upstream portion, thereby allowing the molten metal to fill the casting channel. The molten metal is allowed to cool while passing through the casting channel at the downstream portion to solidify sufficiently to retain the shape of the casting channel when exiting the stationary die.

The present invention is able to manufacture a ribbon of material having a profiled layer of metal thereon in a manner where the profile does not have to be later machined in an additional process. This saves material, time and labor and it therefore costs less to produce such a product in a manner according to the present invention than with the common prior method.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
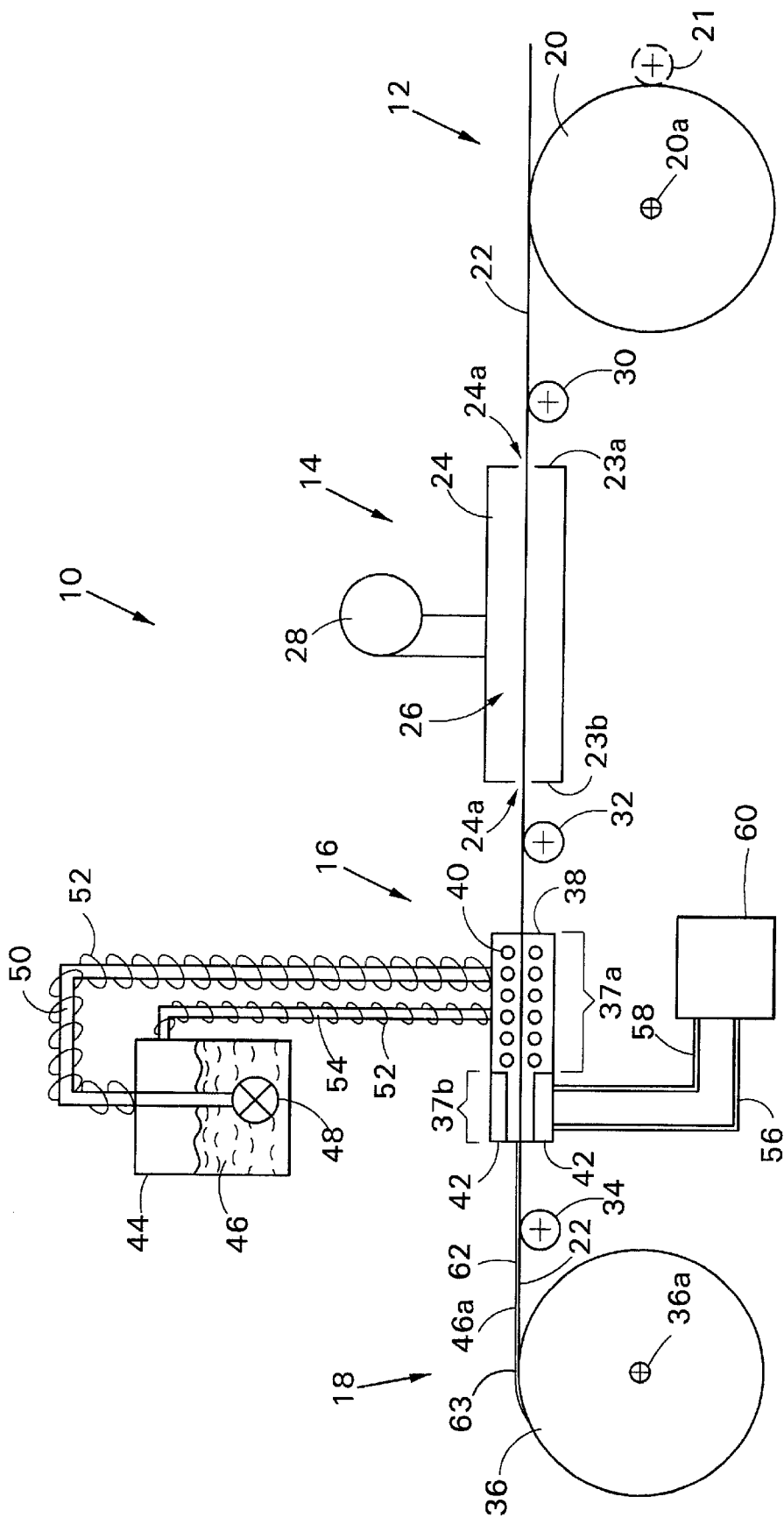
FIG. 1 is a schematic view of an embodiment of the present invention casting apparatus.
Figure 5:
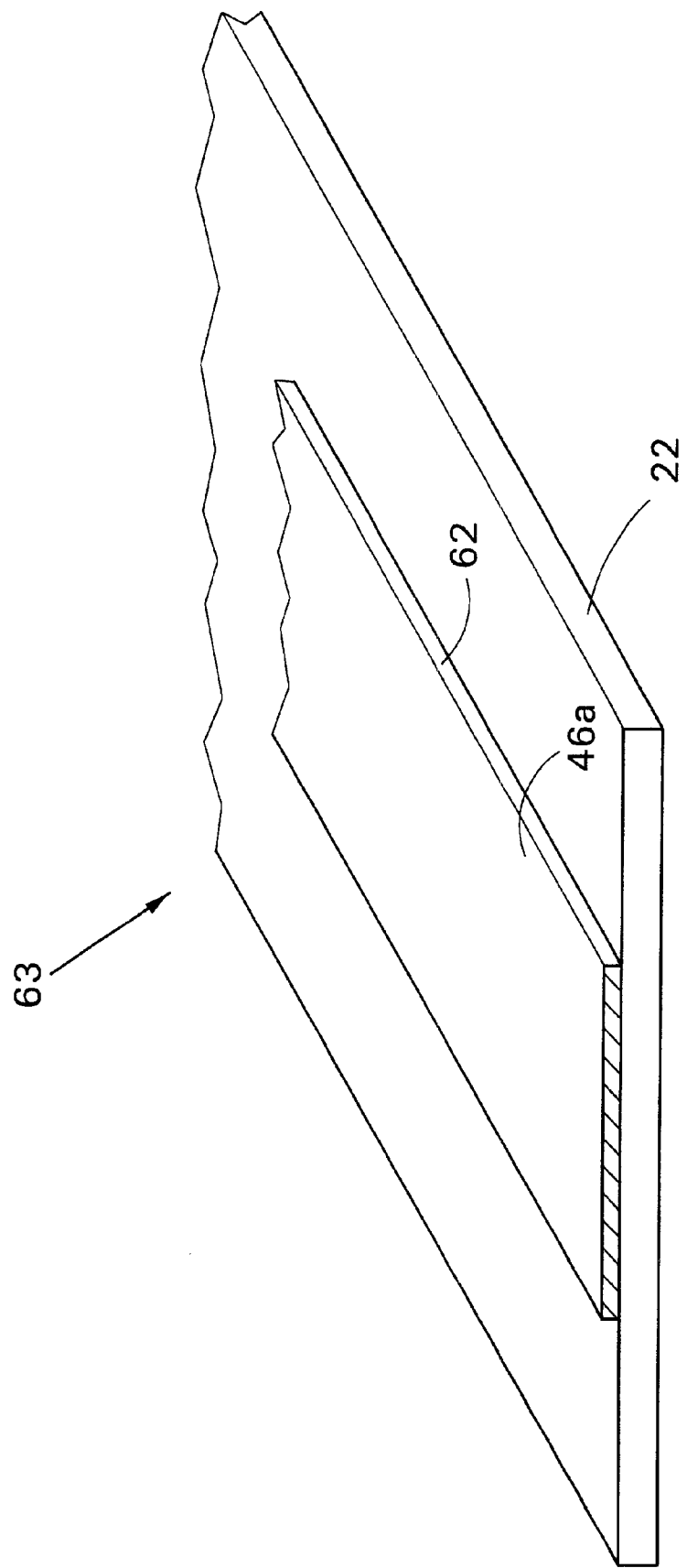
FIG. 5 is a perspective view of a metallic ribbon having a profile of cast metal formed thereon in accordance with the present invention.

Referring to FIG. 1, casting apparatus 10 is employed for casting a dimensionally consistent profile 62 (FIG. 5) of metal such as solder onto a moving metallic strip or ribbon 22, for example, formed from copper. Casting apparatus 10 generally includes an unwind station 12 for unwinding the metallic ribbon 22 from a roll 20, a preheating station 14 for preheating the metallic ribbon 22, a casting station 16 for casting molten solder 46 onto the metallic ribbon 22, and a windup station 18 for winding the resulting bimetal laminate product 63 into a roll 36.

In use, metallic ribbon 22 unwound from roll 20 at unwind station 12, passes through and is preheated within the interior 26 of a heating chamber 24 by a heater 28 at preheating station 14. The metallic ribbon 22 then passes through a stationary casting die 38 at casting station 16. Molten solder 46 is pumped by a pump 48 from a heated pot or chamber 44 through inlet pipe 50 to the casting die 38. The interior of casting die 38 is shaped to guide the metallic ribbon 22 therethrough as well as to mold the molten solder 46 onto the metallic ribbon 22. The casting die 38 has an upstream portion 37a that is heated by heaters 40 to lengthen the time that the molten solder 46 is in a liquid state so that the solder 46 does not solidify too quickly. The molten solder 46 is shaped or formed by casting die 38 onto the metallic ribbon 22 while moving through casting die 38. The molten solder 46 begins solidifying while still within the casting die 38. Shortly after exiting the casting die 38, the once molten solder 46 has been transformed into a dimensionally consistent profile 62 of hardened or solidified solder 46a (FIG. 5) that is adhered or bonded to the metallic ribbon 22, thereby resulting in a bimetal laminate 63. Casting die 38 has a downstream portion 37b which is cooled by coolers 42 to speed up the solidification process of the molten solder 46 while passing through the downstream portion 37b of casting die 38. The bimetal laminate 63 is then rolled up into a roll 36 at windup station 18.

A more detailed description of casting apparatus 10 now follows. Unwind station 12 typically includes an axle 20a upon which roll 20 is placed, thereby allowing roll 20 to spin or rotate while metallic ribbon 22 is pulled therefrom. Axle 20a is commonly a rod that is positioned horizontally as shown. Optionally, axle 20a can be extended vertically from a flat surface so that roll 20 is unwound from a horizontal position. The rod is typically stationary but can be fitted with bearings for rotation. Optionally, a brake 21 can be employed to control the speed at which roll 20 spins. Additionally, the rotation of roll 20 can alternatively be controlled by driving axle 20a with a motor.

Windup station 18 includes a power driven axle 36a which winds the finished bimetal laminate 63 into a roll 36. In the embodiment shown in FIG. 1, windup station 18 also pulls the metallic ribbon 22 from roll 20 and through casting die 38. An idler roll 34 is positioned between casting die 38 and windup station 18 for guiding the bimetal laminate 63. Alternatively, a pair of opposed drive rolls may be positioned upstream of casting die 38 for pulling metallic ribbon 22 from roll 20 in which case windup station 18 only pulls metallic ribbon 22 through casting die 38 before winding up the bimetal laminate 63.

Preheating station 14 includes a narrow elongate heating chamber 24 having narrow horizontal slot like openings 24a at the upstream 23a and downstream 23b ends for allowing the metallic ribbon 22 to enter and exit heating chamber 24. Idler rollers 30 and 32 positioned near the upstream 23a and downstream 23b ends, respectively, help guide the metallic ribbon 22 into and from heating chamber 24. Heating chamber 24 is preferably made of metal such as sheet steel in order to withstand heat, but may be made of other suitable materials such as ceramics or masonry. In the embodiment shown in FIG. 1, heating chamber 24 is generally cylindrical in shape with a circular cross section. In this embodiment, heater 28 is typically a hot air blower/heater which blows hot air into the interior of heating chamber 24, thereby heating the interior thereof, and is capable of heating the metallic ribbon 22 moving within heating chamber 24 to about 150° F. The narrow slot like openings 24a minimize the amount of heat contained within heating chamber 24 that escapes. Preheating metallic ribbon 22 helps the molten solder 46 adhere better to metallic ribbon 22. Some contaminants on the surfaces of metallic ribbon 22 may be removed by the preheating process. Although heating chamber 24 is preferably cylindrical in shape, alternatively, heating chamber 24 can have any suitable cross section such as a rectangular or polygonal cross section, or a cross section formed by a combination of curves, or curves and planar sections. The length of heating chamber 24 may be varied depending upon the speed at which metallic ribbon 22 moves. For example, in one embodiment, heating chamber 24 is three to five feet long. Although a hot air blower/heater is preferred for preheating metallic ribbon 22, alternatively, electrical heating elements or flames can be positioned within heating chamber 24 along its longitudinal length.

Pot or chamber 44 melts and keeps the solder 46 in a liquid state at a temperature of about 600° F to 650° F for a solder composition of about 25% tin (Sn), 62% lead (Pb), 10% bismuth (Bi) and 3% silver (Ag). It is understood that the temperature of molten solder 46 within pot 44 will vary depending upon the composition of the solder employed since different solder compositions have different melting points. The inlet pipe 50 connected to casting die 38 is heated by a heater 52 so that the molten solder 46 pumped therethrough by pump 48 does not solidify within inlet pipe 50. Heater 52 is typically a heating coil that is wrapped around inlet pipe 50 as shown. Pump 48 preferably pressurizes casting die 38 with molten solder 46. A return pipe 54 can be optionally coupled between casting die 38 and pot 44 to allow excess molten solder 46 to return to pot 44 in order to help control the pressure of the molten solder 44 within casting die 38 to a constant level. The pressure of the molten solder 46 can be further controlled by a pressure control valve coupled to return pipe 54. Return pipe 54 is also heated by a heater 52.

Figure 2:
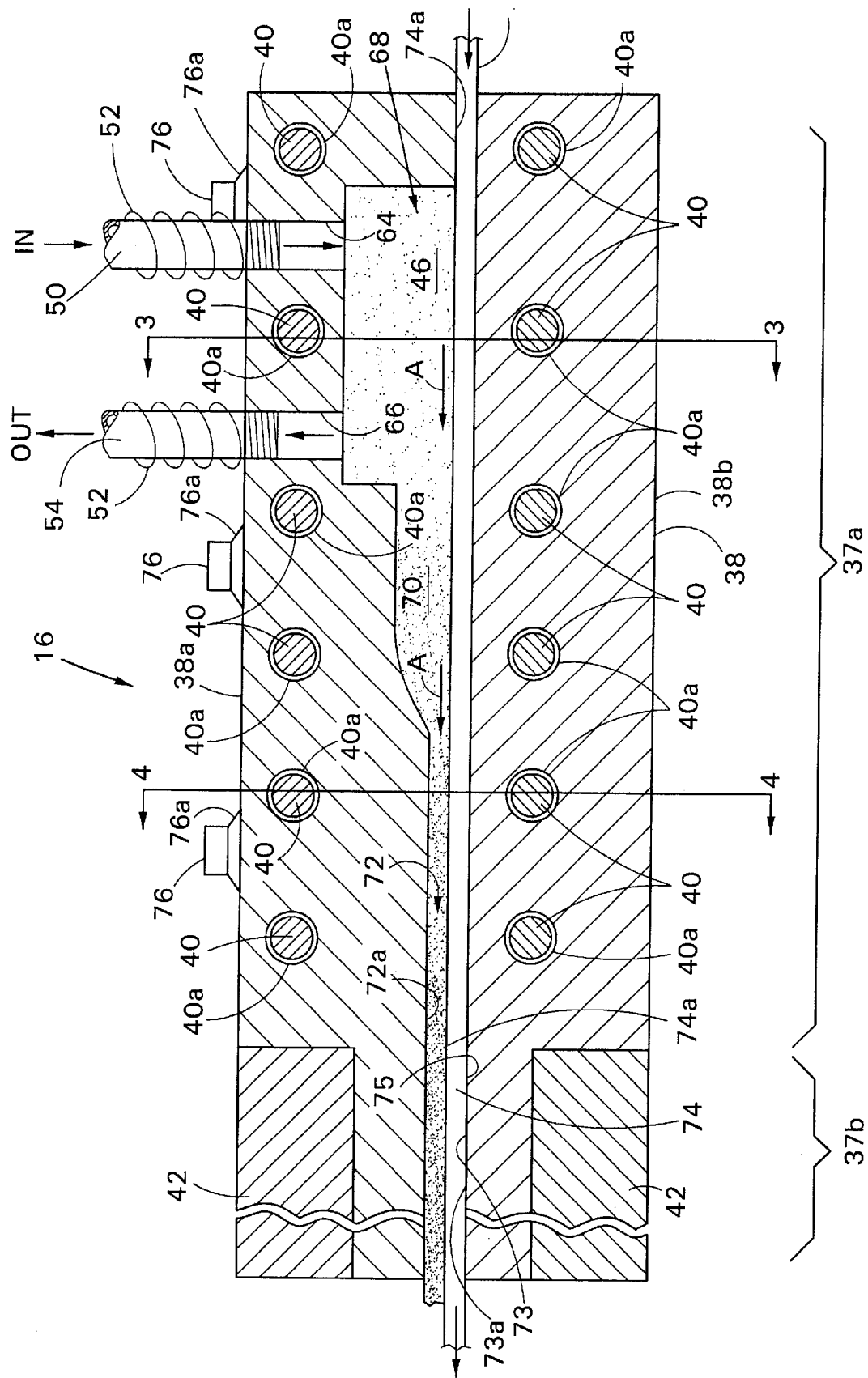
FIG. 2 is a side sectional view of a casting die that is casting molten metal on a moving strip.
Figure 3:
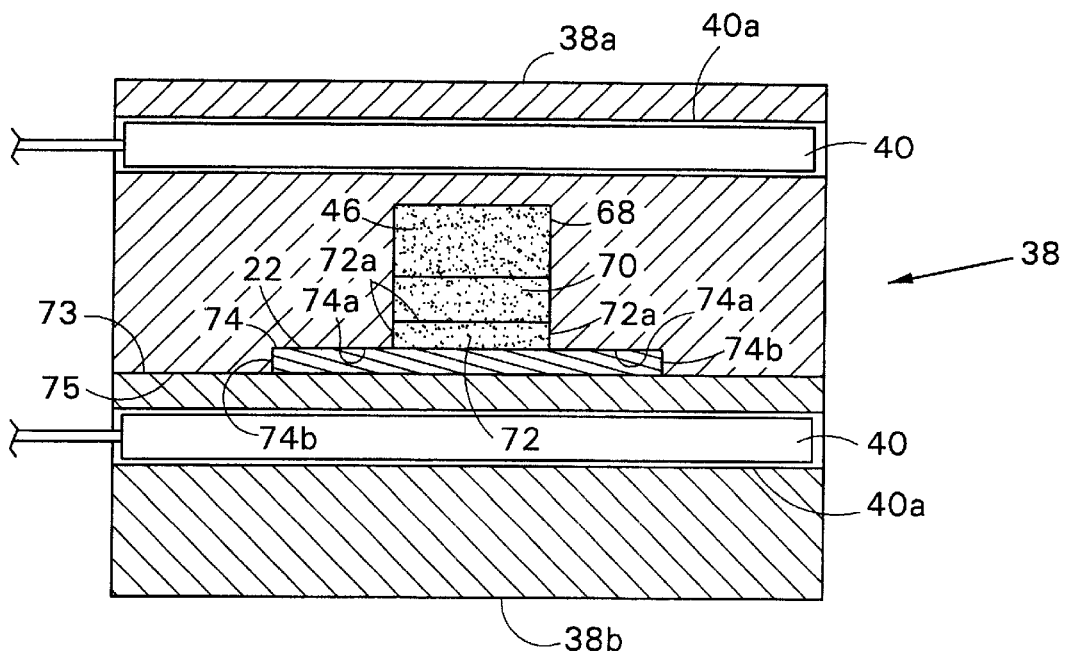
FIG. 3 is a sectional view of the casting die of FIG. 2 taken along lines 3—3.
Figure 4:
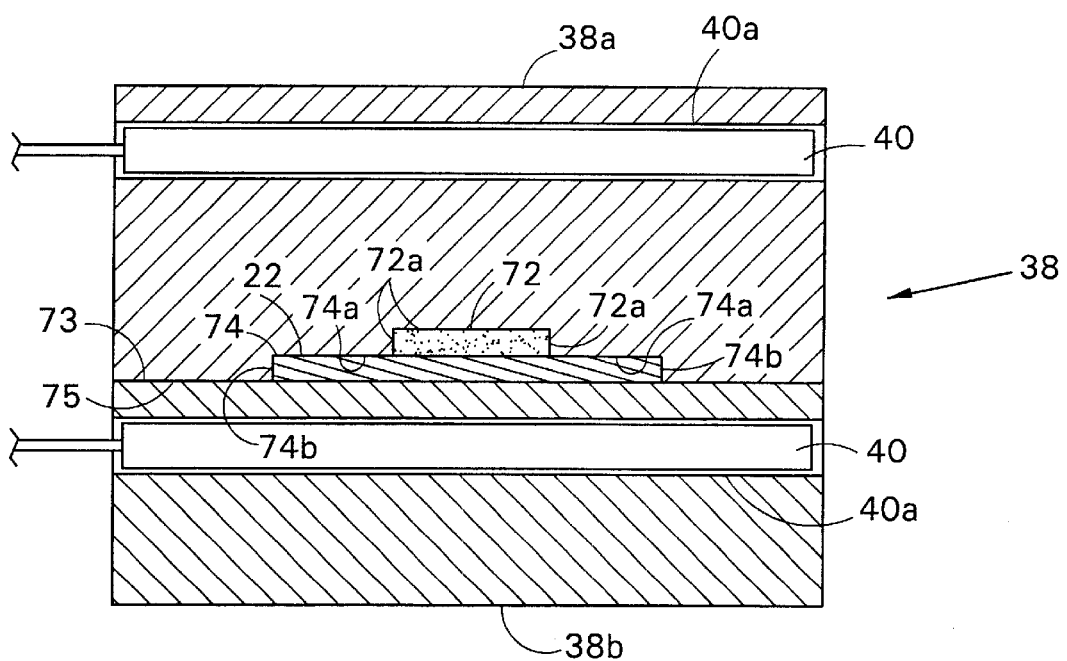
FIG. 4 is a sectional view of the casting die of FIG. 2 taken along lines 4—4.

Referring to FIGS. 2–4, casting die 38 typically includes a casting portion 38a and a supporting portion 38b which are clamped together by a series of bolts 76 (FIG. 2). The support portion 38b has a flat surface 73 which mates with the flat surface 75 of casting portion 38a. Springs such as Belville spring washers 76a can be optionally employed to allow portions 38a/38b to move apart slightly to accommodate thermal expansion of metallic ribbon 22 within casting die 38. The casting portion 38a includes a small cavity therein forming a solder reservoir 68. The solder reservoir 68 has an inlet opening 64 to which the inlet pipe 50 from pot 44 is coupled. If a return pipe 54 to pot 44 is employed, an outlet opening 66 is formed which is coupled to return pipe 54. In the embodiment shown, casting portion 38a also has a centrally positioned guide channel 74 formed within the flat surface 75 (FIGS. 3 and 4) longitudinally along the length of casting portion 38a for guiding metallic the ribbon 22 therethrough. A casting channel 72 is centrally formed within guide channel 74 downstream from solder reservoir 68 and has casting surfaces 72a for casting the molten solder 46 onto the metallic strip 22 in the desired profile 62 with consistent dimensions. The solder reservoir 68 and the casting channel 72 are connected to each other by a tapering transition region 70 which curves from the deeper solder reservoir 68 to join with the shallower casting channel 72. The transition region 70 can be angled rather than curved. As can be seen in FIG. 2, the solder reservoir 68, the transition region 70 and the casting channel 72 are horizontally or longitudinally positioned in line with each other in the direction of solder flow and face the metallic strip 22. Although FIG. 3 depicts the solder reservoir 68, the transition region 70 and the casting channel 72 all having the same width, alternatively, in some embodiments, solder reservoir 68 and transition region 70 are narrower than casting channel 72. The guide channel 74 extends through the flat surface 75 of casting portion 38a and is therefore open on that side. Consequently, the region of the flat surface 73 of support portion 38b that faces guide channel 74 forms a support structure or surface 73a for enclosing guide channel 74 to support and trap the metallic ribbon 22 to abut against casting portion 38a within guide channel 74. Alternatively, the guide channel 74 can be formed in the support portion 38b. In addition, half of the guide channel 74 can be formed in the casting portion 38a and half in the support portion 38b.

Both casting and support portions 38a/38b of casting die 38 have a series of holes 40a therethrough at the upstream portion 37a for receiving electric heaters 40 therein (FIGS. 1 and 2). Alternatively, heating devices may be positioned externally about casting die 38. The heaters 40 heat the casting die 38 to a temperature sufficient to keep the molten solder 46 in a liquid form long enough to flow within casting channel 72 to fill and be formed by casting channel 72. The heaters 40 are typically all set at the same temperature but, alternatively, the downstream heaters 40 may be set at lower temperatures than the upstream heaters 40 to gradually lower the temperature of the molten solder 46 as the molten solder 46 continues to travel through the casting channel 72. The downstream portion 37b of casting and support portions 38a/38b are cooled by coolers 42 (FIG. 1) for more rapidly solidifying the molten solder 46 moving within the downstream portion 37b of casting channel 72. Coolers 42 are typically water cooled blocks of copper that are placed at the downstream portion 37b of casting and support portions 38a/38b. Water cooled by a chiller 60 is circulated through passages in the copper blocks via water lines 56 and 58. Alternatively, passages for the chilled water can be formed directly within the casting and support portions 38a/38b. Also, cooling devices can be mounted externally to casting die 38.

Casting die 38 is preferably formed of hardened steel and may be plated, such as with chrome, for example, or other suitable materials to which solder does not readily adhere. The length of casting die is typically 7 to 12 inches long with 7–9 inches being the more common length. Longer casting die lengths are also possible. In an embodiment for casting a rectangular profile 62 of hardened solder 46a that is 0.620 inch wide by 0.014 inch high, on a metallic ribbon 22 that is tin coated and 0.031 inches thick by 1.516 inches wide such as that seen in FIG. 5, solder reservoir is about ¼ inch deep, ½ inch wide and about 3 inches long. The casting channel 72 is 0.015 inch deep by 0.622 inch wide. Transition region 70 is about 1 inch long and is about 0.050 inches deeper than casting channel 72 at the upstream end before gradually curving to join with casting channel 72. Casting die 38 is capable of molding molten solder 46 onto metallic ribbon 22 at speeds as slow as 5 feet per minute without significant leakage of molten solder from casting channel 72.

Referring to FIG. 2, when casting molten solder 46 onto the metallic ribbon 22, the metallic ribbon 22 moves through casting die 38 while being guided by guide channel 74. Portions of the heated casting and support portions 38a/38b of casting die 38 which contact metallic ribbon 22 further heat the metallic ribbon 22 by conduction. The molten solder 46 occupying solder reservoir 68 is in contact with the metallic ribbon 22. Guide channel 74 has sealing surfaces 74a surrounding solder reservoir 68 on the upstream (FIG. 2) and lateral sides as well as on the lateral sides of transition region 70 and casting channel 72 (FIGS. 3 and 4) which seal against the surface of metallic ribbon 22 to prevent leakage therebetween. The support portion 38b presses the metallic ribbon 22 to abut against the sealing surfaces 74a of the casting portion 38a with enough pressure to provide such sealing. Consequently, the molten solder 46 is limited to flowing downstream into the casting channel 72. As the metallic ribbon 22 moves past solder reservoir 68, the molten solder 46 contacting metallic ribbon 22 bonds with and is pulled downstream by the moving metallic ribbon 22 in the direction of arrows "A" into transition region 70 (FIG. 2). The transition region 70 tapers into the casting channel 72 so that the transition from the deeper solder reservoir 68 to the shallower casting channel 72 is gradual (FIGS. 2 and 3). Therefore, the molten solder 46 moving in the direction of arrows "A" is able to flow from the solder reservoir 68 into the casting channel 72 more easily and quickly. Downstream flow of the molten solder 46 within casting channel 72 is limited in part by solder 46 solidifying downstream within casting channel 72. Solder reservoir 68 is provided with molten solder 46 at a sufficient rate to replenish the molten solder 46 that is carried away by the moving metallic ribbon 22 so that casting channel 72 can be continuously supplied with enough solder 46 to be completely filled with molten solder 46. Heating the upstream portion 37a of casting die 38 keeps the molten solder 46 in a liquid form when the solder 46 enters the casting channel 72 which allows the solder 46 to flow outwardly to contact the casting surfaces 72a and assume the shape defined by the casting surfaces 72a of casting channel 72 (FIG. 4). The moving molten solder 46 is contained within the volume surrounded by the casting surfaces 72a of casting channel 72 and the metallic ribbon 22. The sealing surfaces 74a of guide channel 74 seal against the surface of the moving metallic ribbon 22 on opposite lateral sides of casting channel 72 so that solder 46 does not leak from casting channel 72 while still molten. As a result, the solder 46 is held in the shape of the casting channel 72 while traveling through casting die 38 from the molten stage and through the stage in which the solder 46 is cooled by coolers 42 and begins to solidify. The lateral guide surfaces 74b of guide channel 74 (FIGS. 3 and 4) keep the metallic ribbon 22 positioned properly relative to casting channel 72 so that the molten solder 46 is consistently applied to metallic ribbon 22 at the desired location.

The coolers 42 cool the downstream portion 37b of casting die 38 to a temperature sufficient to at least begin to harden the molten solder 46 moving within, casting channel 72 (FIG. 2). Depending upon the temperature of the downstream portion 37b of casting die 38 and the speed of metallic ribbon 22 therethrough, the solder 46 may leave the casting die 38 while either in a plastic state or in a hardened state. While in the plastic state, the solder 46 is rigid enough to retain the shape of casting channel 72 before completely solidifying shortly thereafter. Moving the solidifying solder 46 through casting channel 72 past the casting surfaces 72a may help smooth the solder 46 so that the finished profile 62 has a smooth surface finish which would not be provided if the solder 46 was merely melted onto metallic ribbon 22 without casting die 38. As the molten solder 46 begins to solidify, the solder 46 contracts slightly so that friction between the solidifying solder 46 and the casting surfaces 72a is minimized. In cases where the solder 46 becomes completely hardened within casting die 38, this allows the metallic ribbon 22 and hardened solder 46 to pass through the casting die 38 without damaging the surface of the profile 62. The dimensions of the finished cooled profile 62, such as height and width (FIG. 5), is typically consistently about 0.001 to 0.002 inches less than the dimensions of the casting channel 72 with a surface variation of ±0.0002 inches after shrinking. Consequently, the finished profile 62 can be made with dimensional consistency. Since the metallic ribbon 22 is heated to some degree when the molten solder 46 is applied, a strong bond is obtained therebetween. When the solder 46 and the metallic ribbon 22 cool, both the solder 46 and the metallic ribbon 22 undergo some shrinking or contracting simultaneously which allows a relatively strong bond to be maintained therebetween. If the metallic ribbon 22 was not heated, shrinkage of the solder 46 relative to the metallic ribbon 22 would likely weaken the bond therebetween.

While this invention has been particularly shown and described with references to preferred embodiments thereof, it will be understood by those skilled in the art that various changes in form and details may be made therein without departing from the scope of the invention encompassed by the appended claims.

For example, a flux station and/or cleaning station can be included to treat the metallic ribbon 22 before the casting station 16. Such treating can also include roughening the surface of the metallic ribbon 22 for increased adherence of the solder 46 to the metallic ribbon 22. In addition, although metallic ribbon 22 is often a tin coated copper ribbon, metallic ribbon 22 can be uncoated copper, as well as other suitable coated or uncoated metals such as bronze, brass, steel, nickel, etc. Profile 62 can also be cast upon non-metallic heat resistant ribbons or strips by the present invention apparatus. The present invention may be also employed to cast polymers on a moving strip. Although casting apparatus 10 is shown to cast profile 62 on top of metallic ribbon 22, alternatively, casting apparatus 10 can be configured to cast profile 62 onto a ribbon 22 at other suitable orientations such as upside down from that shown. It is understood that the positioning of profile 62 on ribbon 22 and the profile configuration can be varied to any desirable position and configuration. For example, profile 62 can be positioned closer to one edge of ribbon 22 and can have curved or angled surfaces. Furthermore, the axle 20a of unwind station 12 can be replaced with rollers positioned under roll 20 for supporting and allowing roll 20 to spin while unwinding. Also, although the downstream end of casting die is shown to be cooled by chilled water, alternatively, an air cooled system can be employed such as with cooling fins and/or forced air. A radiator may be employed with the cooling system.

Preheating station 14 may be omitted in some applications. In such cases, the casting die 38 can be employed to heat the metallic ribbon 22 by conduction. The casting die 38 can have an extended heated section. Although the stationary casting die 38 is shown to have casting and support portions 38a/38b which are each half of casting die 38, the stationary casting die 38 can be formed from portions that are configured differently from that shown and can include additional components. Although a guide channel 74 has been shown for guiding metallic ribbon 22, alternatively, rollers or intermittent tabs can be employed for guiding metallic ribbon 22. Also, rollers can be employed for supporting metallic ribbon 22 against casting portion 38a. It is understood that particular parameters of the components of casting apparatus 10 vary depending upon the application in hand. Typical variables include the size and shape of the ribbon 22 and profile 62, the solder composition, speed of ribbon 22, etc. In some embodiments, the solder reservoir 68 and/or transition region 70 of casting die 38 can be omitted. The solder reservoir 68 can also be positioned above casting channel 72.

What is claimed is:

1. An apparatus for casting molten metal onto a moving strip of material comprising:

a stationary die having upstream and downstream portions with a casting portion, past which the strip of material is capable of being moved, the casting portion having a casting channel extending from the upstream portion through the downstream portion for facing the moving strip for containing and shaping the molten metal into a profile against the moving strip, the stationary die having within the die only a stationary support for supporting the moving strip against the casting channel;

a heating arrangement for heating the upstream portion of the stationary die to prevent the molten metal from solidifying within the casting channel at said upstream portion, thereby allowing the molten metal to fill the casting channel, the casting channel at the downstream portion allowing the molten metal to cool while passing therethrough to solidify sufficiently to retain the shape of the casting channel when exiting the stationary die.

2. The apparatus of claim 1 in which the apparatus is configured for casting molten solder onto a moving metallic strip.

3. The apparatus of claim 2 further comprising a cooling system for cooling the downstream portion of the stationary die.

4. The apparatus of claim 3 in which the cooling system comprises a recirculating fluid cooling system.

5. The apparatus of claim 1 in which the casting portion of the stationary die is adapted to abut the moving strip such that the casting channel of the stationary die and the moving strip define the profile of the cast metal therebetween.

6. The apparatus of claim 5 in which a guide channel is formed in the casting portion of the stationary die for guiding the moving strip therethrough, the moving strip being held against the casting portion by a support portion of the stationary die.

7. The apparatus of claim 1 in which a reservoir for containing a supply of molten metal is formed in the stationary die in communication with the casting channel.

8. The apparatus of claim 7 in which the reservoir and casting channel are connected by a tapering transition region.

9. The apparatus of claim 8 further comprising a delivery conduit for delivering the molten metal to the reservoir in the stationary die.

10. The apparatus of claim 9 further comprising a heated chamber for storing the molten metal and supplying the delivery conduit with the molten metal.

11. The apparatus of claim 10 further comprising a pumping device for pumping the molten metal through the delivery conduit.

12. The apparatus of claim 1 in which the heating arrangement comprises at least one heating device.

13. The apparatus of claim 1 further comprising a preheating station for preheating the moving strip prior to casting the molten metal thereon.

14. An apparatus for casting and bonding molten solder onto a moving metallic strip comprising:

a stationary die having upstream and downstream portions with a casting portion, past which the metallic strip is capable of being moved, the casting portion having a casting channel extending from the upstream portion through the downstream portion for facing the moving metallic strip for containing and shaping the molten solder into a profile against the moving metallic strip, the stationary die having guide surfaces for guiding the moving metallic strip in relation to the casting channel and also having within the die only a stationary support for supporting the moving strip against the casting channel;

a heating arrangement for heating the upstream portion of the stationary die to prevent the molten solder from solidifying within the casting channel at said upstream portion, thereby allowing the molten solder to fill the casting channel, the casting channel at the downstream portion allowing the solder to cool while passing therethrough to solidify sufficiently to retain the shape of the casting channel when exiting the stationary die.

15. The apparatus of claim 14 in which the casting portion of the stationary die is adapted to abut the moving strip such that the casting channel of the stationary die and the moving strip define the profile of the cast solder therebetween.

16. The apparatus of claim 15 in which a guide channel is formed in the casting portion of the stationary die for guiding the moving strip therethrough, the moving strip being held against the casting portion by a support portion of the stationary die.

17. The apparatus of claim 16 in which a reservoir for containing a supply of molten solder is formed in the stationary die in communication with the casting channel.

18. The apparatus of claim 17 in which the reservoir and casting channel are connected by a tapering transition region.

19. A stationary die for casting molten metal onto a moving strip of material comprising:

a reservoir for containing molten metal;

a casting channel having casting surfaces for containing and shaping the molten metal into a profile against the moving strip;

a tapering transition region connecting the reservoir to the casting channel, wherein the reservoir, the transition region and the casting channel are longitudinally aligned and configured to face the moving strip, the stationary die having within the die only a stationary support for supporting the moving strip against the casting channel.

20. A method of forming an apparatus for casting molten metal onto a moving strip of material comprising:

providing a stationary die having upstream and downstream portions with a casting portion, past which the strip of material is capable of being moved, the casting portion having a casting channel extending from the upstream portion through the downstream portion for facing the moving strip for containing and shaping the molten metal into a profile against the moving strip, the stationary die having within the die only a stationary support for supporting the moving strip against the casting channel; and providing a heating arrangement for heating the upstream portion of the stationary die to prevent the molten metal from solidifying within the casting channel at said upstream portion, thereby allowing the molten metal to fill the casting channel, the casting channel at the downstream portion allowing the molten metal to cool while passing therethrough to solidify sufficiently to retain the shape of the casting channel when exiting the stationary die.

21. The method of claim 20 in which the moving strip is a metallic strip and the molten metal is molten solder, the method further comprising providing a cooling system for cooling the downstream portion of the stationary die.

22. The method of claim 20 further comprising adapting the casting portion of the stationary die to abut the moving strip such that the casting channel of the stationary die and the moving strip define the profile of the cast metal therebetween.

23. The method of claim 22 further comprising forming a guide channel in the casting portion of the stationary die for guiding the moving strip therethrough, the moving strip being held against the casting portion by a support portion of the stationary die.

24. The method of claim 20 further comprising forming a reservoir for containing a supply of molten metal in the stationary die in communication with the casting channel.

25. The method of claim 24 further comprising connecting the reservoir and casting channel with a tapering transition region.

26. The method of claim 25 further comprising providing a delivery conduit for delivering the molten metal to the reservoir in the stationary die.

27. The method of claim 26 further comprising providing a heated chamber for storing the molten metal and supplying the delivery conduit with the molten metal.

28. The method of claim 27 further comprising providing a pumping device for pumping the molten metal through the delivery conduit.

29. The method of claim 20 further comprising providing a preheating station for preheating the moving strip prior to casting the molten metal thereon.

30. A method of casting molten metal onto a moving strip of material comprising:

moving the strip of material past a stationary die having upstream and downstream portions, a casting channel facing the moving strip extending from the upstream portion through the downstream portion;

containing and shaping the molten metal into a profile against the moving strip with the casting channel, the stationary die having within the die only a stationary support for supporting the moving strip against the casting channel;

heating the upstream portion of the stationary die to prevent the molten metal from solidifying within the casting channel at said upstream portion, thereby allowing the molten metal to fill the casting channel; and allowing the molten metal to cool while passing through the casting channel at the downstream portion to solidify sufficiently to retain the shape of the casting channel when exiting the stationary die.

* * * * *